US010602725B1

(12) United States Patent
Ewald

(10) Patent No.: US 10,602,725 B1
(45) Date of Patent: Mar. 31, 2020

(54) MODULAR HABITAT APPARATUSES FOR AQUATIC LIFE

(71) Applicant: David W. Ewald, Wonder Lake, IL (US)

(72) Inventor: David W. Ewald, Wonder Lake, IL (US)

( * ) Notice: Subject to any disclaimer, the term of this patent is extended or adjusted under 35 U.S.C. 154(b) by 0 days.

(21) Appl. No.: 16/434,299

(22) Filed: Jun. 7, 2019

Related U.S. Application Data

(60) Provisional application No. 62/740,174, filed on Oct. 2, 2018.

(51) Int. Cl.
*A01K 61/00* (2017.01)
*A01K 61/70* (2017.01)

(52) U.S. Cl.
CPC ..................... *A01K 61/70* (2017.01)

(58) Field of Classification Search
CPC ........ A01K 61/70; A01K 61/73; A01K 61/75; A01K 61/77; A01K 61/78; E02B 3/046
USPC ............................ 119/207, 208, 221, 238–40
See application file for complete search history.

(56) References Cited

U.S. PATENT DOCUMENTS

| | | | |
|---|---|---|---|
| 3,323,310 A | 6/1967 | Arpin | |
| 4,221,500 A | 9/1980 | Garrett | |
| 4,337,007 A | 6/1982 | Smith | |
| 4,395,970 A * | 8/1983 | Kunkle | A01K 61/54 119/240 |
| 4,993,362 A * | 2/1991 | Jimbo | A01K 61/70 119/221 |
| 4,997,311 A * | 3/1991 | Van Doren | E02B 3/046 405/30 |
| 5,042,424 A * | 8/1991 | Hense | A01K 61/70 119/221 |
| 5,201,136 A * | 4/1993 | LaMorte | A01K 61/70 43/4 |
| 5,269,254 A * | 12/1993 | Gagliano | A01K 61/54 119/237 |
| 5,443,326 A | 8/1995 | Bernard et al. | |
| 5,451,443 A | 9/1995 | Wechsler | |
| 5,785,002 A * | 7/1998 | Cazin | A01K 61/70 119/223 |
| 5,876,151 A | 3/1999 | Brown et al. | |
| 6,467,993 B1 | 10/2002 | Utter et al. | |
| 6,824,327 B1 * | 11/2004 | Walter | A01K 61/70 405/33 |

(Continued)

FOREIGN PATENT DOCUMENTS

FR 2239120 A5 * 2/1975 ............... E02B 3/12

*Primary Examiner* — Lisa L Tsang
(74) *Attorney, Agent, or Firm* — Scherrer Patent & Trademark Law, P.C.; Stephen T. Scherrer; Monique A. Morneault

(57) ABSTRACT

A modular habitat apparatus for attaching and anchoring aquatic life hiding units thereto comprises a weighted apparatus comprising a mat or platform for submersion in waterways wherein aquatic life hiding units may be attached thereto. The present invention further comprises a modular system of one or more habitat apparatuses having aquatic life hiding units attached thereto. Moreover, a plurality of habitat apparatuses may be fastened together and installed horizontally to cover a relatively large area, and/or connected together both horizontally and vertically to create three-dimensional habitats for aquatic life. Systems and methods of making and using the same are further provided.

18 Claims, 6 Drawing Sheets

(56) References Cited

U.S. PATENT DOCUMENTS

| | | | |
|---|---|---|---|
| 6,962,130 B1* | 11/2005 | Kennedy | A01K 61/70 119/221 |
| 7,512,326 B1* | 3/2009 | Eldredge | G03B 17/08 396/25 |
| 7,513,711 B1* | 4/2009 | Walter | A01K 61/70 |
| 7,587,991 B2* | 9/2009 | Buck | A01G 33/00 119/239 |
| 8,033,250 B2* | 10/2011 | Calinski | A01K 61/70 119/208 |
| 8,147,165 B2 | 4/2012 | Sung | |
| 8,640,651 B2 | 2/2014 | Ewald | |
| 9,963,209 B2 | 5/2018 | O'Connell et al. | |
| 2002/0088408 A1* | 7/2002 | Lee | A01K 61/70 119/221 |
| 2003/0177982 A1 | 9/2003 | Jenkins | |
| 2006/0056914 A1* | 3/2006 | Arai | E02B 3/046 405/30 |
| 2015/0139733 A1 | 5/2015 | Liang | |

* cited by examiner

MODULAR HABITAT APPARATUSES FOR AQUATIC LIFE

The present invention claims priority to U.S. Provisional Pat. App. No. 62/740,174, titled "Modular Habitat Mat for Aquatic Life," filed Oct. 2, 2018, which is incorporated by reference herein in its entirety.

TECHNICAL FIELD

The present invention relates to modular habitat apparatuses for attaching and anchoring aquatic life hiding units thereto. Specifically, the present invention comprises a weighted apparatus comprising a mat or platform for submersion in waterways wherein aquatic life hiding units may be attached thereto. The present invention further comprises a modular system of one or more habitat apparatuses having aquatic life hiding units attached thereto. Moreover, a plurality of habitat apparatuses may be fastened together and installed horizontally to cover a relatively large area, and/or connected together both horizontally and vertically to create three-dimensional habitats for aquatic life. Systems and methods of making and using the same are further provided.

BACKGROUND

Aquatic life often requires underwater cover to thrive and reproduce. Indeed, many species of aquatic organisms utilize underwater cover as habitat, for protection from predators, finding food, and seeking mates. However, natural processes and human-led projects have damaged aquatic life habitats, often removing or injuring natural aquatic life habitats. For example, removal of rocks, debris, logs, or other natural detritus in a waterway may be done to make waterways safe for boat travel and/or human recreation. However, the removal of these natural systems often damages the natural ecological habitats of the aquatic life present. In addition, artificially constructed reservoirs and lakes have been and are frequently created, typically turning dry land into a waterway. In such a case, natural aquatic habitats are frequently simply not present.

Currently, in an attempt to remediate damage to natural aquatic habitats, many products on the market attempt to provide artificial aquatic habitats. However, due to sometimes harsh environmental conditions, oftentimes the artificial aquatic habitats decay too quickly. In addition, artificial aquatic habitats may be difficult to install, may be too heavy, too large for transport, too lightweight to stay put on waterway floors, and most are manufactured from first generation materials.

For example, in an attempt to create artificial habitats for aquatic life, heavy equipment that is past its useful life may be deposited on a waterway bottom. Specifically, it is known to scuttle boats, train cars, tires or even dump armored tanks in waterways at the end of their useful lives. The heavy equipment thus provides spaces that may be used as underwater cover by aquatic life or may provide surfaces from which natural cover may grow, thereby protecting aquatic life from predators. However, the use of heavy equipment may release toxic substances into an aquatic habitat, including, for example, petroleum products, such as oils, gases, fuels, or the like, heavy metals, or other like toxic substances. A need, therefore, exists for modular habitat apparatuses for aquatic life that are safe to use in underwater environments. Moreover, a need exists for modular habitat apparatuses for aquatic life utilizing post-consumer recycled material or content to further aid in reducing the impact of waste on the environment.

Oftentimes, artificial aquatic habitats are disposed within a waterway, and due to unique conditions may have difficulty anchoring or rooting to provide optimal aquatic life habitats. Specifically, if the body of water is moving, such as via tides, currents, eddies, or other like movement, then artificial aquatic habitats may also move as the water moves, thereby preventing aquatic life from effectively utilizing the artificial aquatic habitats. A need, therefore, exists for modular habitat apparatuses for aquatic life that resists movement in underwater environments. More specifically, a need exists for modular habitat apparatuses for aquatic life that maintain their positions, even with relatively strong water movement.

The need to increase the weight of artificial aquatic habitats installed in waterways has become increasingly apparent as fisheries professionals have undertaken substantial long-term investment in aquatic life restoration and improvements thereto. Currently, most aquatic life habitat products available for installation in freshwater lakes and reservoirs typically require a substantial amount of additional weight to keep them in place on the water bottom. To do so often requires additional materials, time and installation needs that frequently add to the total cost of a remediation project.

Specifically, creation of artificial habitats for aquatic life typically utilize cinder blocks, concrete, anchors, cables and ropes to provide additional weight or anchoring points for artificial aquatic life habitats. The use of these materials is difficult, unwieldy, labor-intensive, and time consuming. Often, the use of these materials typically requires multiple fastening links and connections, thereby providing areas that are easy to snag fishing lines or tangle in boat propellers or anchors. Lack of sufficient weighting or anchoring has also created a theft problem, as individuals often simply pick-up and move artificial fish habitats, either to remove them from the waterway or to move them to a more desirable location for themselves. A need, therefore, exists for weighted modular habitat apparatuses for aquatic life. Specifically, a need exists for weighted modular habitat apparatuses for aquatic life that reduce or eliminate movement of the habitat apparatuses so as to increase their viability, size and use by aquatic life.

Besides the toxic nature of certain materials utilized to create artificial aquatic life habitats, it is typical that certain materials utilized in aquatic life habitats may quickly decay. For example, artificial aquatic life habitats are often made of wood or metals. Woods may quickly rot and decay in underwater environments, and certain metals may rust. A need, therefore, exists for modular habitat apparatuses for aquatic life that is made from materials that resist decay over time in underwater environments. Moreover, a need exists for modular habitat apparatuses for aquatic life that are made from recycled or repurposed aquatic-safe materials like fiberglass, cement and plastics that are safe to use in underwater environments.

The more surface area of a waterway that is covered by aquatic life habitats, the more successfully aquatic life may thrive. However, it is often difficult to cover large areas with artificial aquatic life habitats. A need exists for modular habitat apparatuses for aquatic life that may individually cover relatively large areas of waterway floors. Moreover, a need exists for modular habitat apparatuses for aquatic life that may easily be interconnected together to cover relatively large areas of waterway floors.

Irregular waterway floors often make it difficult to properly position artificial habitats. Specifically, waterway floors, such as lake and ocean bottoms, stream bottoms, river bottoms and the like may have irregular features such as rocks, boulders, logs, and other like material that may make it difficult to position aquatic life habitats and keep them standing vertical and upright. Moreover, oftentimes waterway floors are soft sediments of mud or sand, which may make it difficult to place artificial aquatic life habitats without the habitats sinking significantly into the waterway floor with soft sediment. A need, therefore, exists for modular habitats for aquatic life that may be easily positioned on irregular waterway bottoms. Likewise, a need exists for modular habitats for aquatic life that may resist sinking in soft sediment, mud or sand waterway bottoms.

Oftentimes, existing known artificial aquatic life habitats are not configured optimally to provide the proper configuration ideal for aquatic life to thrive. Oftentimes, artificial habitats simply cover a two-dimensional area with habitat elements extending slightly upwardly, perpendicular to the waterway floor. However, aquatic life typically thrives in artificial habitat configurations that are in three-dimensions, with individual habitat elements extending both horizontally and vertically. Moreover, much aquatic life thrives in artificial habitat configurations whereby individual habitat elements extend horizontally, and both vertically up, from below, and down from above. A need, therefore, exists for modular habitat apparatuses for aquatic life that may be interconnected together in three-dimensions. In addition, a need exists for modular habitat apparatuses for aquatic life that may provide surfaces for individual habitat elements that may be disposed both horizontally and vertically, either upwardly or downwardly.

SUMMARY OF THE INVENTION

The present invention relates to a modular habitat apparatuses comprising a mat or platform for attaching and anchoring aquatic life hiding units thereto. Specifically, the present invention comprises a weighted mat or platform for submersion in waterways wherein aquatic life hiding units may be attached thereto. The present invention further comprises a modular system of one or more habitat apparatuses having aquatic life hiding units attached thereto. Moreover, a plurality of habitat apparatuses may be grouped together and installed horizontally to cover a relatively large area, and/or connected together both horizontally and vertically to create three-dimensional habitats for aquatic life. Systems and methods of making and using the same are further provided.

To this end, in an embodiment of the present invention, a modular aquatic life habitat apparatus is provided. The modular aquatic life habitat apparatus comprises: a first platform comprising a first surface, a second surface opposite the first surface, and apertures therein; at least one weight disposed within an internal compartment of the platform; and a first aquatic life hiding unit extending from the top surface of the platform.

In an embodiment, the first platform is a plastic pallet made from reclaimed materials.

In an embodiment, the first surface is selected from the group consisting of a grate, a grille, and a rack.

In an embodiment, the first platform comprises a crate.

In an embodiment, the internal compartment within the first platform forms a footing that extends from the second surface of the platform.

In an embodiment, the apertures form a grid pattern within the first platform.

In an embodiment, the first aquatic life hiding unit comprises at least one rigid and elongated projection member comprising a body and first and second opposing ends.

In an embodiment, the first opposing end of the first aquatic life hiding unit extends from the weight disposed within the internal compartment of the platform.

In an embodiment, the first opposing end of the aquatic life hiding unit is attached to the platform.

In an embodiment, the first opposing end of the aquatic life hiding unit is disposed within a container, and wherein the container is attached to the platform.

In an embodiment, the modular aquatic life habitat apparatus further comprises: a second platform comprising a first surface, a second surface opposite the first surface, and apertures therein, wherein the second platform comprises a second aquatic life hiding unit extending therefrom, and further wherein the second platform is connected to the first platform.

In an embodiment, the second platform is attached directly to the first platform.

In an embodiment, the modular aquatic life habitat apparatus further comprises: a connection between the first platform and the second platform.

In an embodiment, the first platform and the second platform are connected together in a planar configuration.

In an embodiment, the second platform is connected to the first platform at an angle.

In an embodiment, the modular aquatic life habitat apparatus further comprises: a third platform comprising a top surface, a bottom surface, and apertures therein, wherein the second platform comprises a second aquatic life hiding unit extending therefrom, and further wherein the third platform is connected to the first platform or the second platform.

In an embodiment, the first platform is attached to the second platform and the second platform is attached to the third platform, wherein the first platform, the second platform, and the third platform form a three-dimensional configuration having an internal space.

In an embodiment, the modular aquatic life habitat apparatus further comprises: a second aquatic life hiding unit extending into the internal space of the three-dimensional configuration from the second surface of the platform.

In an embodiment, the modular aquatic life habitat apparatus further comprises: a connector comprising a first end and a second opposing the first end, the connector running from a first point above the apparatus to a second point below the apparatus, wherein the first platform is connected to the connector at a position between the first and second points.

In an embodiment, the first end of the connector is connected to an anchor disposed on a bed at a bottom of the body of water.

It is, therefore, an advantage and objective of the present invention to provide modular habitat apparatuses for aquatic life that are safe to use in underwater environments.

Moreover, it is an advantage and objective of the present invention to provide modular habitat apparatuses for aquatic life utilizing post-consumer material or content to further aid in reducing the impact of waste on the environment.

In addition, it is an advantage and objective of the present invention to provide modular habitat apparatuses for aquatic life that resists movement in underwater environments.

More specifically, it is an advantage and objective of the present invention to provide modular habitat apparatuses for aquatic life that maintain their positions, even with relatively strong water movement.

Further, it is an advantage and objective of the present invention to provide weighted modular habitat apparatuses for aquatic life.

Still further, it is an advantage and objective of the present invention to provide weighted modular habitat apparatuses for aquatic life that reduce or eliminate movement of the habitat apparatuses so as to increase their viability and use by aquatic life.

Moreover, it is an advantage and objective of the present invention to provide modular habitat apparatuses for aquatic life that is made from materials that resist decay over time in underwater environments.

Further, it is an advantage and objective of the present invention to provide modular habitat apparatuses for aquatic life that are made from recycled plastics that are safe to use in underwater environments.

In addition, it is an advantage and objective of the present invention to provide modular habitat apparatuses for aquatic life that may individual cover relatively large areas of waterway floors.

And, it is an advantage and objective of the present invention to provide modular habitat apparatuses for aquatic life that may easily be interconnected together to cover relatively large areas of waterway floors.

Further, it is an advantage and objective of the present invention to provide modular habitats for aquatic life that may be easily positioned on irregular waterway bottoms.

Still further, it is an advantage and objective of the present invention to provide modular habitats for aquatic life that may resist sinking in soft sediment, mud or sand waterway bottoms.

Likewise, it is an advantage and objective of the present invention to provide modular habitat apparatuses for aquatic life that may be interconnected together in three-dimensions.

In addition, it is an advantage and objective of the present invention to provide modular habitat apparatuses for aquatic life that may provide surfaces for individual habitat elements that may be disposed both horizontally and vertically, either upwardly or downwardly.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a modular habitat apparatuses for attaching and anchoring aquatic life hiding units thereto. Specifically, the present invention comprises a weighted apparatus comprising a mat or platform for submersion in waterways wherein aquatic life hiding units may be attached thereto. The present invention further comprises a modular system of one or more habitat apparatuses having aquatic life hiding units attached thereto. Moreover, a plurality of habitat apparatuses may be fastened together and installed horizontally to cover a relatively large area, and/or connected together both horizontally and vertically to create three-dimensional habitats for aquatic life. Systems and methods of making and using the same are further provided.

Figure 4:
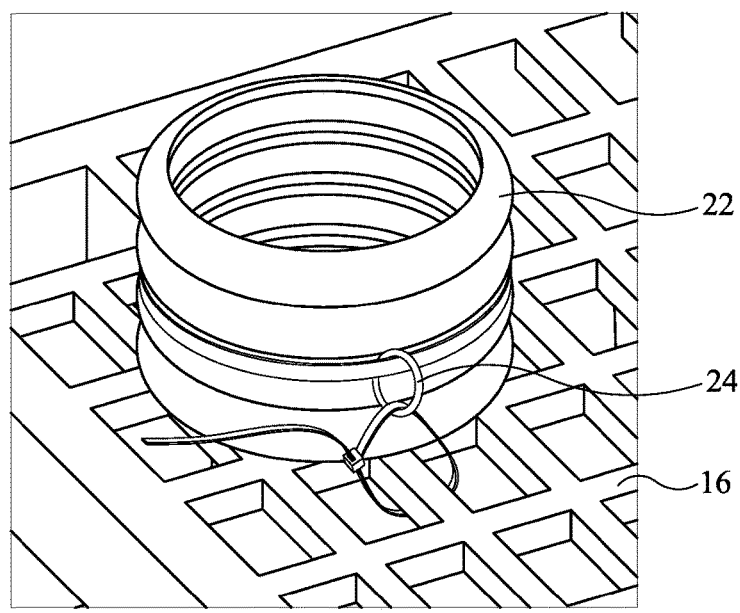
FIG. 4 illustrates a close-up perspective view of a modular habitat apparatus for aquatic life connected thereto to a base of an aquatic life hiding unit in an embodiment of the present invention.

Now referring to the figures, wherein like numerals refer to like parts, a modular habitat apparatus for aquatic life 10 is illustrated in an embodiment of the present invention. The modular habitat apparatus comprises a platform 12 comprising a top surface and a bottom surface and a plurality of compartments 14 comprising spaces to receive a weighted material. Specifically, the spaces within the compartments 14 may be weighted with sand, stone, concrete, cement, or other weighted material apparent to one of ordinary skill in the art. Preferably, the platform 12 comprises a grid, a grille, and/or a rack having a plurality of spaces in an open framework therein, wherein grid, grille or rack elements may be useful for connecting aquatic life hiding units thereon, as illustrated in FIG. 4 and described in more detail below. Moreover, the open framework disposed therein allows air and water to pass therethrough, aiding in setting the modular habitat apparatus dropped from above on a waterway bottom. The grid, grille or rack may also be sized to protect specific aquatic species therein. For example, the grid, grille or rack may be sized to allow aquatic animals of a certain size to move therethrough, but may restrict other aquatic animals that may be too large to pass, thereby providing protection for the smaller aquatic animals.

Figure 1:
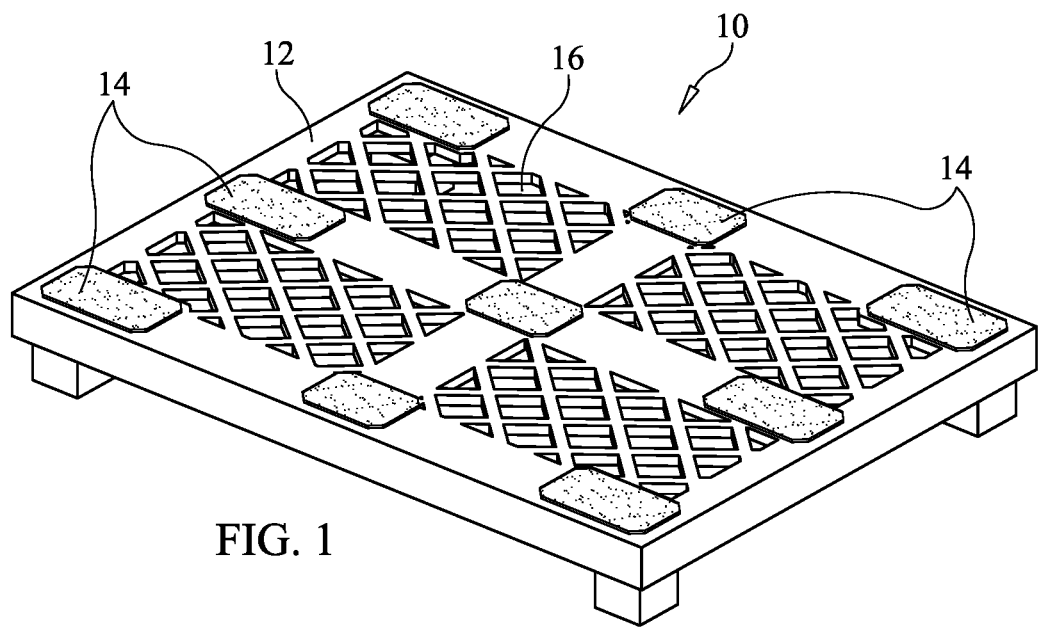
FIG. 1 illustrates a top view of a modular habitat apparatus for aquatic life in an embodiment of the present invention.

FIG. 1 illustrates the modular habitat apparatus 10 in a rectangular configuration, but it should be noted that the modular habitat apparatus 10 may be any geometric or abstract shape, such as round, square, rectangular, triangular, oval, or any other shape deemed beneficial to the intended site-specific use.

Preferably, the modular habitat apparatus 10 may be a plastic pallet. Alternatively, the modular habitat apparatus 10 may be made from a crate. The platform may comprise edges, rims, lips, rails, or other like elements allowing for easy connectivity to aquatic life hiding units or to other modular habitat apparatuses, as disclosed in more detail below. The platform 12 may be made from common materials, such as plastics, fiberglass, wood, cement, concrete, or other like materials. In an embodiment, the platform 12 may be made from newly manufactured plastic material or reclaimed plastic material. Preferably, however, the modular habitat apparatus 10 of the present invention is made from common recycled plastic materials, such as polyethylene, polypropylene, polyvinyl chloride (PVC), or other like recycled plastic materials. More preferably, the modular habitat apparatus 10 may comprise an inert material that does not appreciably leach toxic material into waterways when disposed therein. The use of a recycled plastic pallet is useful as it provides a reduction in waste material when reused for the purposes specified herein.

The weighted compartments 14 of the modular habitat apparatus 10 of the present invention thus allows the modular habitat apparatus 10 to easily and quickly settle on the bottom of the waterway in its desired position. The compartments 14 further distribute the weight of the modular habitat apparatus 10 on the waterway floor, preventing the modular habitat apparatus 10 from sinking into the waterway bottom. Moreover, the weights disposed within the compartments 14 prevent movement of the modular habitat apparatus 10 in water currents, tides or other like water movements.

Figure 2:
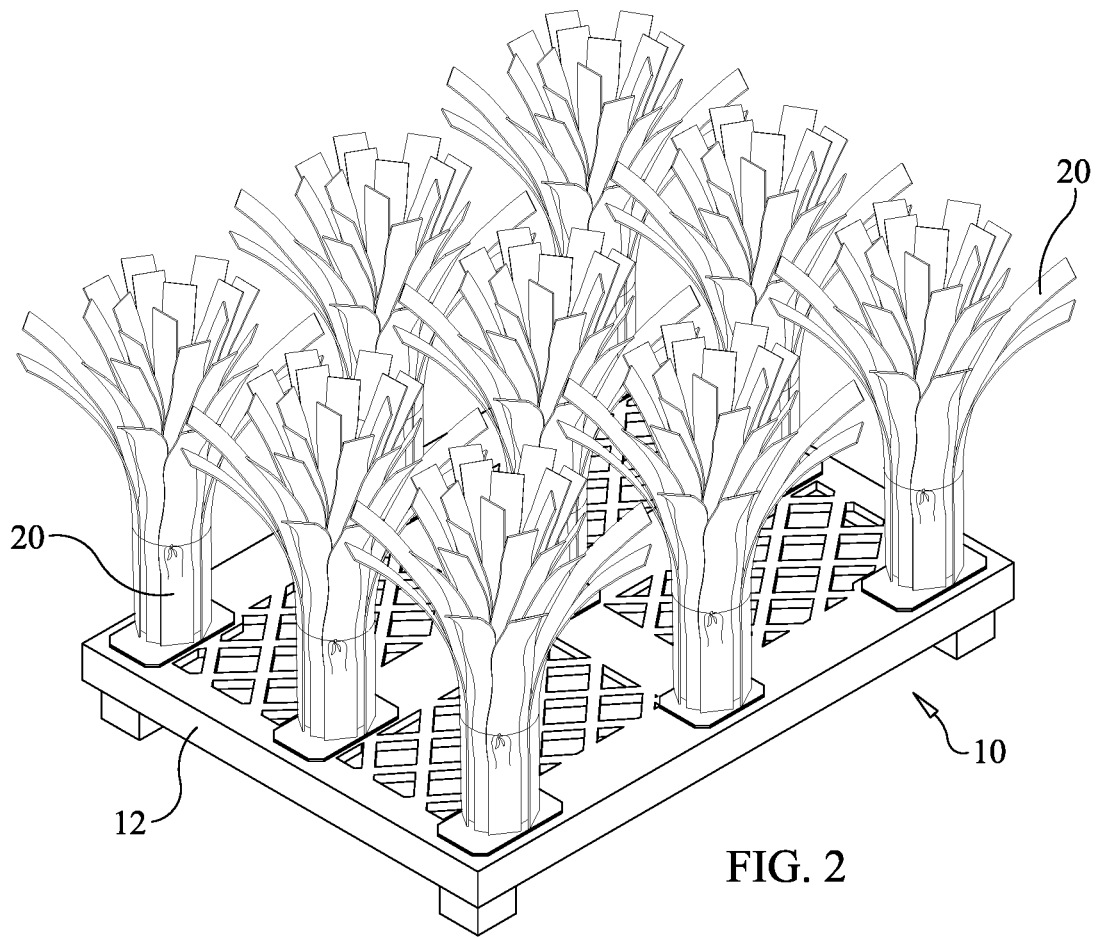
FIG. 2 illustrates a perspective view of a modular habitat apparatus for aquatic life with a plurality of aquatic life hiding units disposed therein in an embodiment of the present invention.
Figure 3:
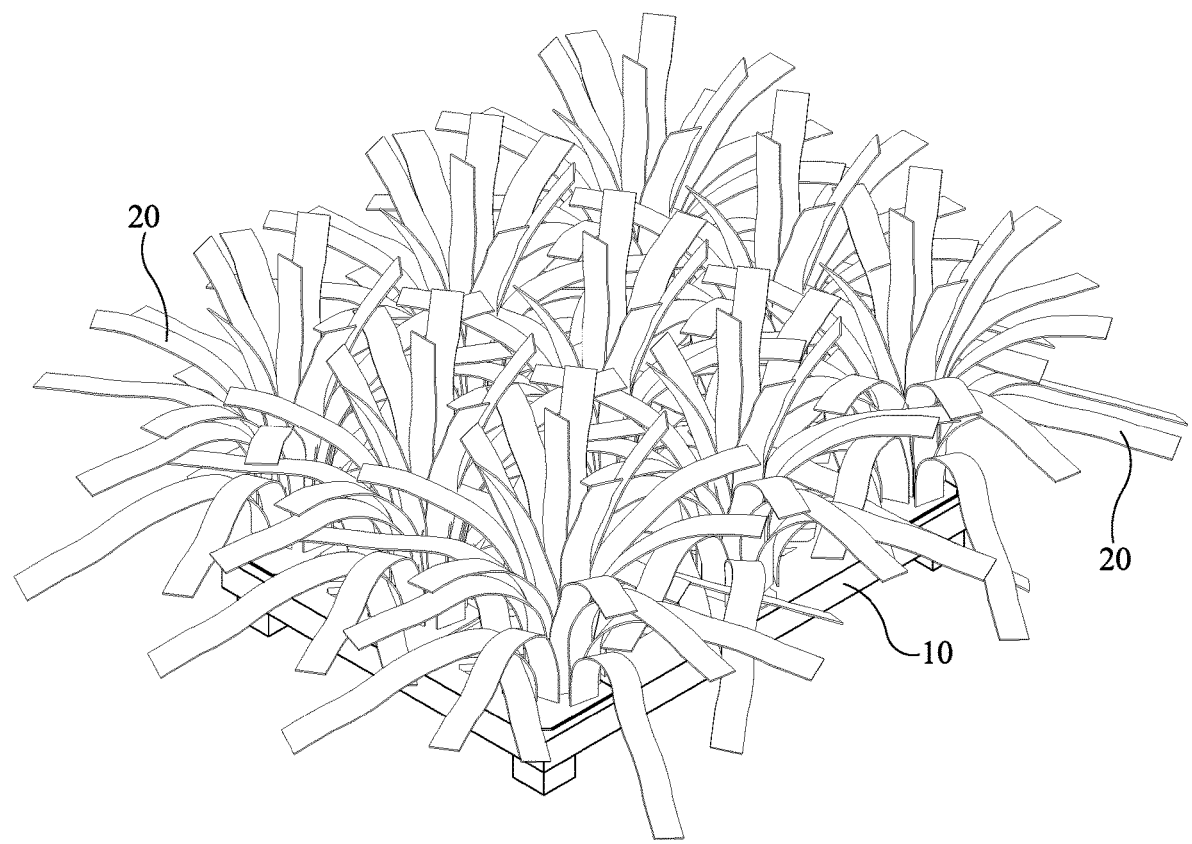
FIG. 3 illustrates a perspective view of a modular habitat apparatus for aquatic life with a plurality of aquatic life hiding units disposed therein in an embodiment of the present invention.

Extending from the weighted compartments 14 may be aquatic life hiding units 20, as illustrated in FIG. 2. Specifically, in an embodiment of the present invention, the compartments 14 may be weighted with sand, stone, or with an adhesive substance like concrete or cement, and embedded therein may be aquatic life hiding units 20. Alternatively, aquatic life hiding units 20 may be connected to the open framework of the modular habitat apparatus 10, such as is illustrated in FIG. 4. Specifically, as shown in FIG. 4, a base 22 of an aquatic life hiding unit 20 may be connected to the open framework 16 of the modular habitat apparatus 10 via one or a plurality of aquatic-safe connectors 24. Thus, a plurality of aquatic life hiding units 20 may be connected to and extend from the modular aquatic life habitat apparatus 10, as illustrated in FIG. 3, forming an ideal multi-faceted aquatic life habitat.

The aquatic life hiding units 20 may contain a plurality of elongated projection members extending from the modular habitat apparatus 10. Preferably, the aquatic life hiding units 20 are artificial and made from plastics, such as reclaimed plastics. Although any aquatic life hiding units may be utilized with the present invention, aquatic life hiding units described in U.S. Pat. No. 8,640,651, titled "Artificial Fish Habitat Employing Fish Hiding Units" may be particularly preferred. U.S. Pat. No. 8,640,651 is incorporated herein by reference in its entirety. Alternatively, natural fish hiding units may be attached to the modular habitat apparatus 10, such as live plants, rocks, wood material, and other like natural materials.

Preferably, the modular habitat apparatus 10 of the present invention, having a plurality of aquatic life hiding units 20 extending therefrom, either extending from the weighted compartments 14, as illustrated in FIG. 2, or extending from bases 22 connected to the open framework thereof, as illustrated in FIG. 4, is floated to a desired location, such as on a boat, raft or other like floating element. The modular habitat apparatus 10 may then be placed within the water way, where the weighted compartments 14 and the open framework grid of the modular habitat apparatus 10 may allow the modular habitat apparatus 10 to quickly sink to the waterway bottom and settle thereon. Preferably, the compartments 14 contact the waterway bottom; however, the modular habitat apparatus 10 may be inverted so that the top surface of the platform 12 contacts the waterway bottom, providing more surface area to contact the waterway bottom. This may be useful where the bottom is made of soft sediment, mud or sand, and to aid in preventing the modular habitat apparatus 10 from sinking into the mud or sand.

Alternatively, the modular habitat apparatuses of the present invention may easily be transported on dry land via forklifts and placed in desired locations. For example, modular habitat apparatuses of the present invention may be positioned on dry lake beds or in future artificial reservoirs or lakes prior to inundation with water. Moreover, in the event of water drawdown or drought, where modular habitat apparatuses of the present invention become exposed, the may easily be moved to other locations where needed or desired in the same or similar manner.

Figure 5:
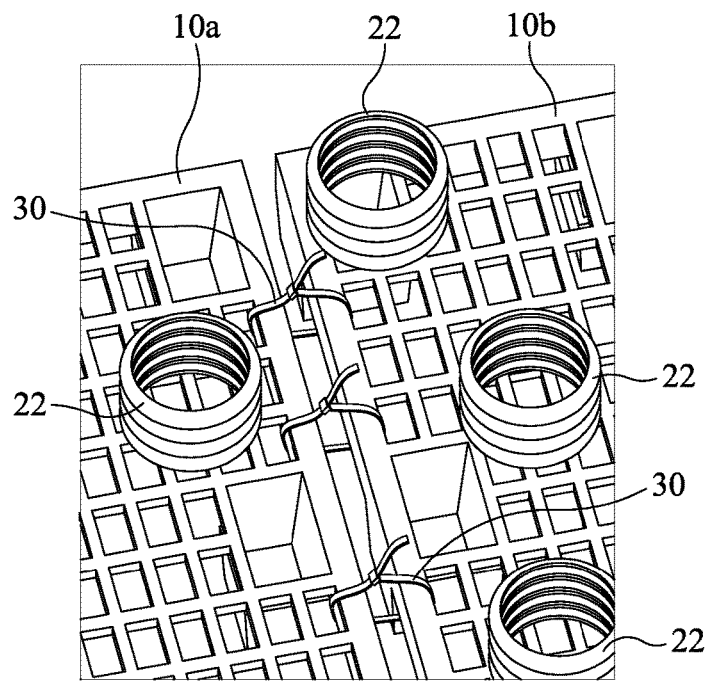
FIG. 5 illustrates a close-up top view of a pair of modular habitat apparatuses for aquatic life interconnected together and further connected to a plurality of bases of aquatic life hiding units.

In an alternate embodiment of the present invention two or more modular habitat apparatuses of the present invention may be connected together to form a train of modular habitat apparatuses for disposing within a waterway. Thus, the modular habitat apparatuses may be linked together to cover a relatively large area with aquatic life hiding units. As illustrated in FIG. 5, first modular habitat apparatus 10a may be interconnected to second modular habitat apparatus 10b via connectors, such as, preferably, zip ties 30, although any connector may be utilized, such as via rings, ropes, ties, cables, chains or other like connectors. As described above, the modular habitat apparatuses 10a, 10b may have a plurality of bases 22 connected thereto, respectively, having aquatic life hiding units extending therefrom (not shown in FIG. 5).

The modular habitat apparatuses 10a, 10b may be relatively loosely connected so that the connection between may flex, such as in a hinge-like manner. Therefore, the modular habitat apparatuses 10a, 10b may conform to a topography of a waterway bottom, thereby aiding in preventing movement of the same, such as via currents or water flow.

The modular habitat apparatuses connected together may form a relatively long chain in one direction or two directions, thereby covering a desired area. Moreover, the use of aquatic life hiding units may be utilized on some modular habitat apparatuses but not others, as desired, thereby forming a desired spacing of aquatic life hiding units.

Figure 6:
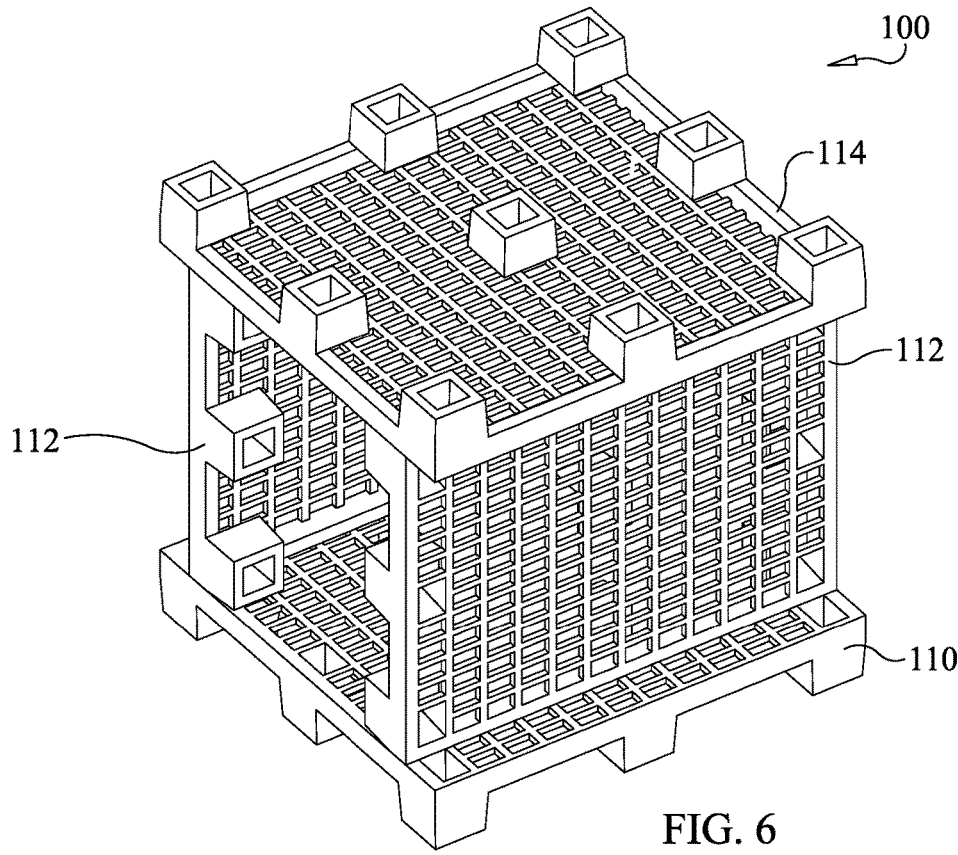
FIG. 6 illustrates a box configuration of a plurality of modular habitat apparatuses for aquatic life in an embodiment of the present invention.
Figure 9:
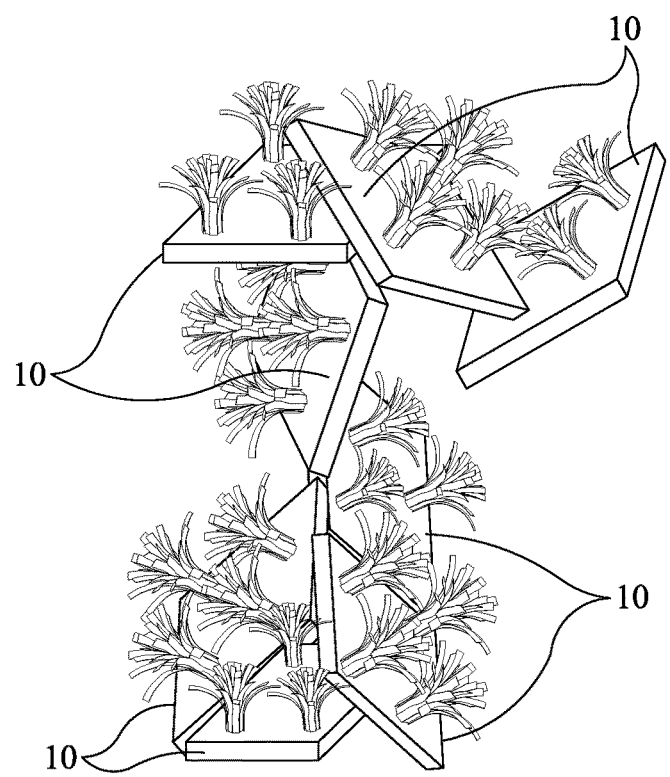
FIG. 9 illustrates a perspective view of an abstract configuration of a plurality of modular habitat apparatuses for aquatic life connected together in an embodiment of the present invention.

Now referring to FIG. 6, a modular habitat box for aquatic life 100 is illustrated in an alternate embodiment of the present invention. The modular habitat box 100 may preferably comprise a plurality of individual modular habitat apparatuses 10 connected together in three-dimensional box configuration. It should be note that the present invention should not be limited to a box configuration, as any three-dimension configuration may be contemplated by connecting the modular habitat apparatuses 10 of the present invention in the manner described herein. For example, FIG. 9 illustrates a configuration where a plurality of habitat apparatuses 10 are attached together in various ways to form a tree-configuration, with individual habitat apparatuses 10 extending in different directions, thereby forming a complex system configured to create a habitat for aquatic life, as described herein. Alternatively, the modular habitat apparatuses 10 may be stacked together at various levels, forming abstract multi-level configurations with individual apparatuses 10 extending at different vertical levels.

The modular habitat box 100 may comprise one or more base modular habitat apparatuses 110, which may preferably comprise the weights therein, such as the weighted compartments as described above. A plurality of side modular habitat apparatuses 112 may be disposed vertically, horizontally, upright, on edge, and a top modular habitat apparatus 114 may be disposed on a top thereof. Preferably and dependent on specific aquatic life units being disposed thereon, the side modular habitat apparatuses 112 and the top modular habitat apparatus 114 may contain an evenly distributed or balanced amount of weights therein, to prevent tipping of the same and to ensure that the base modular habitat apparatus 110 remains on the bottom of the waterway when placed within the waterway. Although the modular habitat box 100 may include open sides, as illustrated in FIG. 6, an alternative configuration may include closed sides, wherein a modular habitat apparatus is disposed around every face of the box, fully enclosing the box. Such a configuration may allow the passage of smaller aquatic life through the grate or grid of the modular habitat apparatuses, but prevent the passage of larger aquatic life, such as predators of the smaller aquatic life, thereby offering a protected area for the smaller aquatic life.

Figure 7:
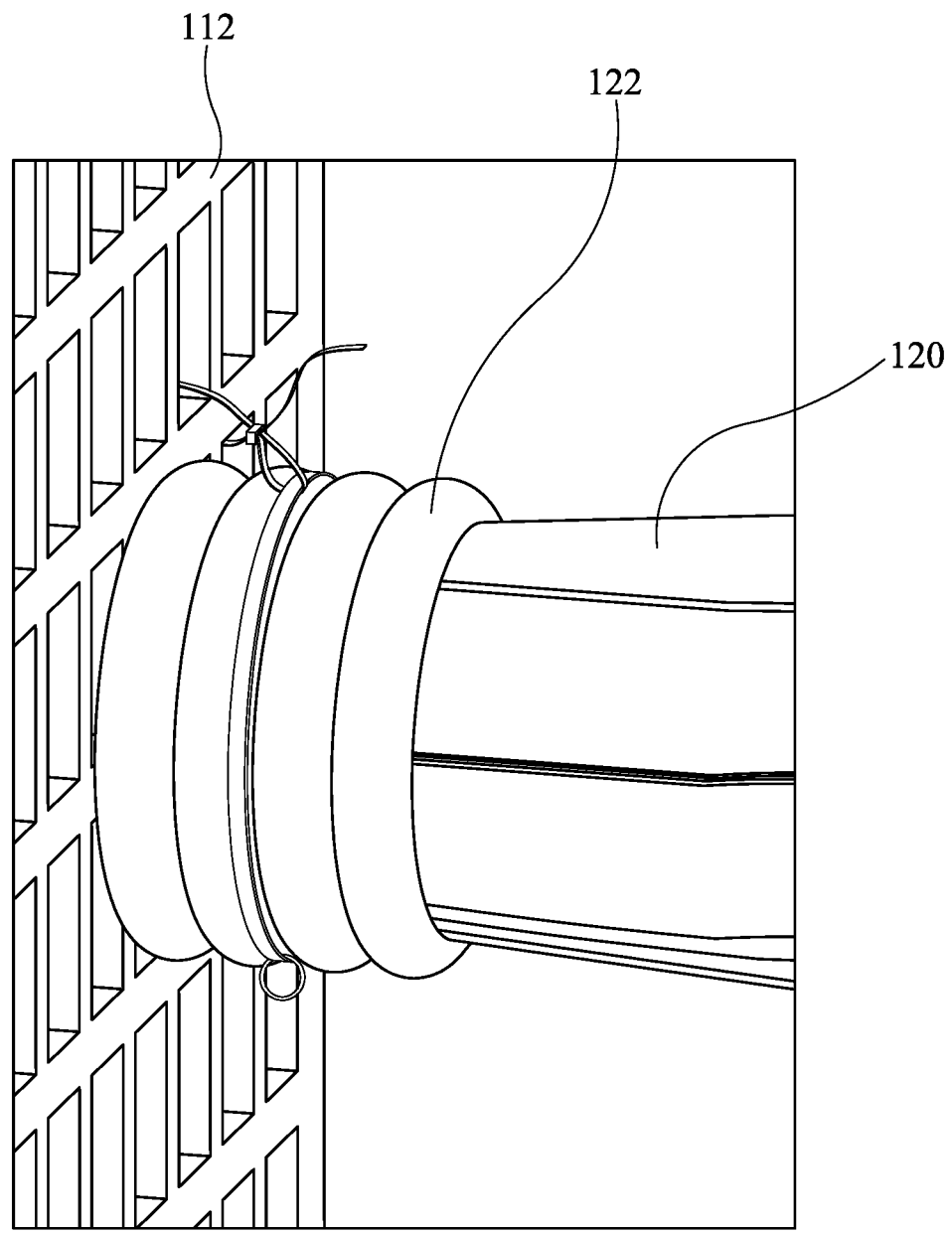
FIG. 7 illustrates a close-up perspective view of a modular habitat apparatus for aquatic life disposed vertically with a connected aquatic life hiding unit in an embodiment of the present invention.

As shown in FIG. 7, an aquatic life hiding unit 120 may extend from a side modular habitat apparatus 112, disposed vertically, so that the aquatic life unit 120 may extend horizontally from the side modular habitat apparatus 112. Preferably, a base 122 having the aquatic life hiding unit 120 extending therefrom, may be connected to the side modular habitat apparatus 112 via connectors, such as ties, rings, ropes or the like.

Figure 8:
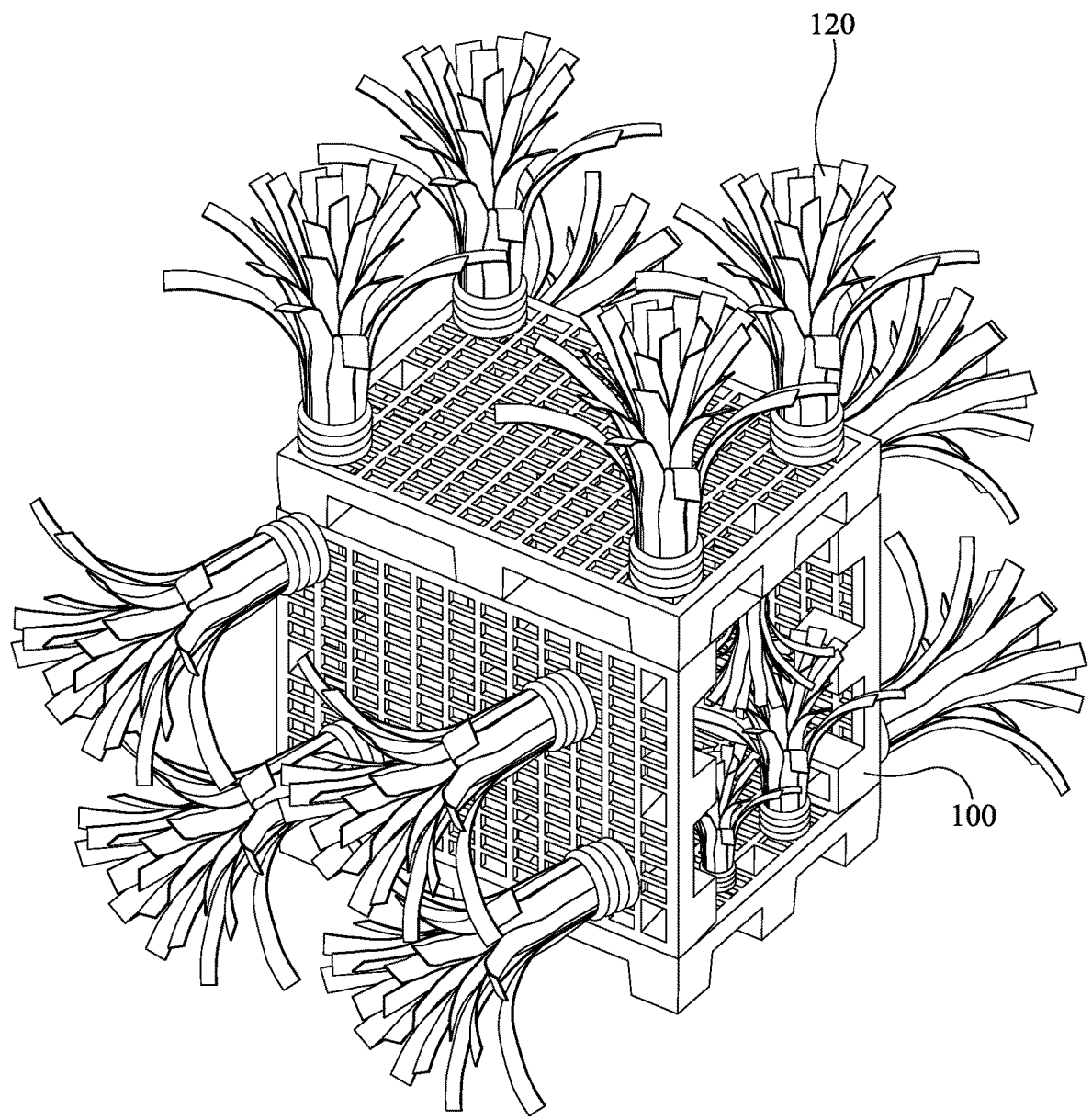
FIG. 8 illustrates a perspective view of a box configuration of a plurality of modular habitat apparatuses for aquatic life connected together and further having a plurality of aquatic life hiding units connected thereto and extending therefrom in an embodiment of the present invention.

Although FIG. 7 illustrates the aquatic life hiding unit 120 extending outwardly, it should be noted that aquatic life hiding units may also be disposed on inside surfaces of the modular habitat box 100, extending inwardly, as illustrated in FIG. 8. Likewise, although not shown in the drawings, aquatic life hiding units may extend vertically upwardly or downwardly from the top modular habitat apparatus 114, as shown in FIG. 8.

Thus, as illustrated in FIG. 8, a three-dimensional configuration of aquatic life hiding units may be constructed to provide an ideal habitat for aquatic life, such as to prevent predators from accessing the interior of the box 100. Moreover, the three-dimensional configuration of aquatic life hiding units and the ability to stack and link aquatic habitat apparatuses, as detailed herein, allows for the aquatic habitats of the present invention to be raised to any level above a waterway floor as needed. Because of the modular nature of the present invention, any configuration of aquatic life habitat apparatuses of the present invention may be created as needed in a specific aquatic environment and/or as desired by a user thereof.

Figure 10:
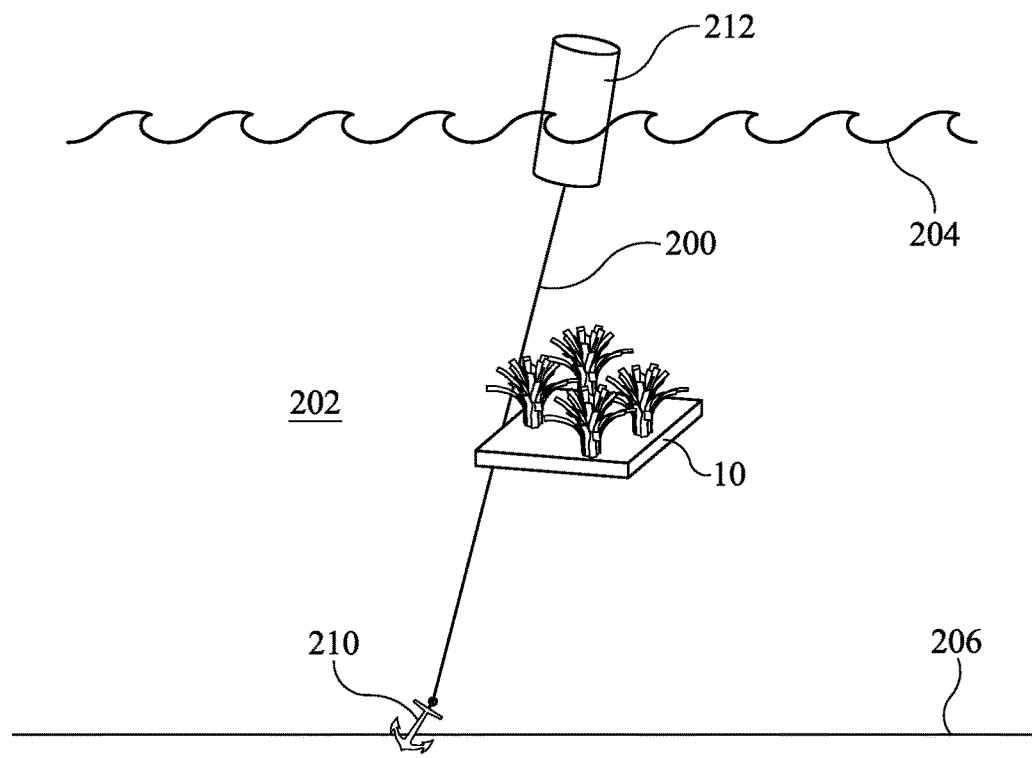
FIG. 10 illustrates a side view of an aquatic life habitat apparatus attached to a line extended between a surface of a body of water and a bed at the bottom of the body of water.

In an alternate embodiment of the present invention, illustrated in FIG. 10, a connector 200, such as a line, rope, a cable, or other like extending element, may be disposed between a first point and a second point within a body of water 202. The first point may be a surface 204 of the body of water, and the second point may be a bed 206 at a bottom of the body of water. However, it should be noted that the connector 200 may be disposed between first and second points mid-depth within the body of water. At least one modular aquatic life habitat apparatus 10 may be connected to the connector at a point between the first and second points so that the modular aquatic life habitat apparatus 10 may be suspended mid-depth within the body of water, thereby providing an aquatic life habitat at a location away from the bed at the bottom of the body of water. For example, in a preferred embodiment of the present invention, the connector 200 may be attached to an anchor 210 on a first end thereof, and to a buoy 212 at a second end thereof, and the modular aquatic life habitat apparatus 10 may be suspended at a location between the surface of the body of water and the bed of the body of water.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A modular aquatic life habitat apparatus comprising:
a first platform formed from a plastic pallet comprising a first substantially flat surface, a second substantially flat surface opposite the first substantially flat surface, and apertures therein, the first platform further comprising a plurality of feet extending substantially perpendicularly from the second substantially flat surface thereof, at least one of the feet having an internal compartment therein;
a weighted material disposed within the internal compartment within the at least one of the feet of the first platform; and
a first aquatic life hiding unit extending from the first substantially flat surface of the first platform, wherein the first aquatic life hiding unit comprises at least one rigid and elongated projection member comprising a body and first and second opposing ends, wherein the first opposing end of the first aquatic life hiding unit extends from the weighted material disposed within the at least one of the internal compartments of the first platform.

2. The modular aquatic life habitat apparatus of claim 1 wherein the first platform is a plastic pallet made from recycled materials.

3. The modular aquatic life habitat apparatus of claim 1 wherein the first substantially flat surface is selected from the group consisting of a grate, a grille, and a rack.

4. The modular aquatic life habitat apparatus of claim 1 wherein the first platform comprises a crate.

5. The modular aquatic life habitat apparatus of claim 1 wherein the apertures form a grid pattern within the first platform.

6. The modular aquatic life habitat apparatus of claim 1 wherein the first opposing end of the aquatic life hiding unit is attached to the first platform.

7. The modular aquatic life habitat apparatus of claim 1 wherein the first opposing end of the aquatic life hiding unit is disposed within a container, and wherein the container is attached to the first platform.

8. The modular aquatic life habitat apparatus of claim 1 further comprising:
   a second platform formed from a second plastic pallet comprising a first substantially flat surface, a second substantially flat surface opposite the first surface, and apertures therein, wherein the second platform comprises a second aquatic life hiding unit extending therefrom, and further wherein the second platform is connected to the first platform.

9. The modular aquatic life habitat apparatus of claim 8 wherein the second platform is attached directly to the first platform.

10. The modular aquatic life habitat apparatus of claim 8 further comprising:
   a connection between the first platform and the second platform.

11. The modular aquatic life habitat apparatus of claim 8 wherein the first platform and the second platform are connected together in a planar configuration.

12. The modular aquatic life habitat apparatus of claim 8 wherein the second platform is connected to the first platform at an angle.

13. The modular aquatic life habitat apparatus of 8 further comprising:
   a third platform formed from a third plastic pallet comprising a top substantially flat surface, a bottom substantially flat surface, and apertures therein, wherein the third platform comprises a third aquatic life hiding unit extending therefrom, and further wherein the third platform is connected to a platform selected from the group consisting of the first platform and the second platform.

14. The modular aquatic life habitat apparatus of claim 13 wherein the first platform is attached to the second platform and the second platform is attached to the third platform, wherein the first platform, the second platform, and the third platform form a three-dimensional configuration forming an internal space.

15. The modular aquatic life habitat apparatus of claim 14 further comprising:
   a fourth aquatic life hiding unit extending into the internal space of the three-dimensional configuration from a platform selected from the group consisting of the first platform, the second platform, and the third platform.

16. The modular aquatic life habitat apparatus of claim 1 further comprising:
   a connector comprising a first end and a second end opposing the first end, the connector running from a first point above the apparatus to a second point below the apparatus,
   wherein the first platform is connected to the connector at a position between the first point and the second point.

17. The modular aquatic life habitat apparatus of claim 16 wherein the first end of the connector is connected to an anchor disposed on a bed at a bottom of a body of water.

18. The modular aquatic life habitat apparatus of claim 1 wherein at least one of the plurality of feet forms a footing for the first platform.

* * * * *